United States Patent [19]
Czompo

[11] Patent Number: 5,728,935
[45] Date of Patent: Mar. 17, 1998

[54] METHOD AND APPARATUS FOR MEASURING GRAVITY WITH LEVER ARM CORRECTION

[76] Inventor: Jozsef Czompo, #409, 100 Varley Lane, Kanata, Ontario, Canada, K2K 1E5

[21] Appl. No.: 689,827

[22] Filed: Aug. 14, 1996

[51] Int. Cl.$^6$ ..................................................... G01V 7/16
[52] U.S. Cl. ............................................. 73/382 G
[58] Field of Search ........................ 73/382 R, 382 G, 73/510; 364/420, 566; 33/365, 395

[56] References Cited

U.S. PATENT DOCUMENTS

| | | | |
|---|---|---|---|
| 3,474,672 | 10/1969 | La Coste et al. . | |
| 4,435,981 | 3/1984 | Carson et al. . | |
| 4,550,601 | 11/1985 | Evans | 73/382 R |
| 5,357,802 | 10/1994 | Hofmeyer | 73/382 G |
| 5,402,340 | 3/1995 | White | 73/382 G |

FOREIGN PATENT DOCUMENTS 2104354  8/1993  Canada .

OTHER PUBLICATIONS

UCGE Reports, No. 20067.Czompo, Jozsef, "Airborne scalar Gravimetry System Errors in the Spectral Domain", University of Calgary, May 1994.

Boedecker, G. et al., "Accelerator/GPS Integration for Strapdown AirborneGravimetry: First Test Results", 'Gravity and Geoid' Meeting Graz, Sep. 1994.

*Primary Examiner*—Christine K. Oda

[57] ABSTRACT

The gravimetry apparatus includes two rigidly connected accelerometer triads and a global positioning system antenna defining a kinematic reference point. The apparatus has a specific layout where the nominal center of the accelerometer triads and the kinematic reference point are collinear and the corresponding accelerometers of the two triads are parallel. In this gravimetry system, the lever arm correction is measured internally and the magnitude of gravity is calculated without the need for stabilized platforms or measurement of the spatial orientation of the gravimeter.

18 Claims, 4 Drawing Sheets

METHOD AND APPARATUS FOR MEASURING GRAVITY WITH LEVER ARM CORRECTION

FIELD OF THE INVENTION

The invention relates to an apparatus and method for measuring gravity without the need for a stabilized platform or measurement of the spatial orientation of the gravimeter. Through a configuration of accelerometer triads and a kinematic acceleration measuring device, accurate gravity measurements can be made by an internal calculation of the lever arm error.

BACKGROUND OF THE INVENTION

In kinematic gravimetry, that is when the gravimeter is moving in space, for example on board a vessel such as a ship, land vehicle or aircraft, the underlying principle for measuring gravitation is Newton's second law of motion in the presence of gravitational forces:

$$\vec{g} = \vec{r} - \vec{f} \quad \text{(Equation 1)}$$

which expresses that the measured gravitation, $\vec{g}$, is the difference between the kinematic acceleration of a point mass and the specific force, f, measured at the point mass. The kinematic acceleration can be measured by any suitable method, such as a global positioning system (GPS) where the movement (position, velocity and acceleration) of a point mass through space can be determined. The specific force acting on a point mass is measured by an accelerometer assembly (which may consist of one or more accelerometers). Hence a gravimeter or gravity sensor is essentially an accelerometer assembly and a gravimetry system is essentially a gravimeter together with instrumentation that measures kinematic acceleration, normally GPS.

In currently available gravimetry systems, knowledge of the gravity sensor orientation in space is required as Equation 1 is a vector equation. In principle, the knowledge of the gravity sensor orientation can be determined in one of two ways by either 1) physically aligning the sensor to a known orientation or 2) measuring its orientation in space.

In order to determine the orientation of the gravity sensor, in the past one class of gravimeters utilize stable platforms in order to make accurate gravity measurements. A second class of gravimeters use gyroscopes or a GPS attitude system to measure the spatial orientation of the gravimeter. This is required computational formulae assume that the spatial orientation of the gravity sensor is known. If the gravity sensor is misaligned, the gravity computations are inaccurate.

Another error source that is related to spatial orientation is the lever arm error. This affects the gravity computations because the physical location at which kinematic acceleration is measured and the location at which a specific force acting on a point mass are physically separated from one another. The lever arm correction therefore attempts to compute any difference in the motions between these two measurement locations. The computation of the correction is usually done using the spatial orientation information between the gravity sensor and the kinematic reference point, since this is usually available from the knowledge of the spatial orientation of the gravimeter platform. Therefore, if the platform alignment is known, that is the platform is stabilized or its orientation is measured, an accurate gravity survey can be completed. However, such a system is limited by the stability of the platform. Accordingly, if the stable platform or the vessel carrying the platform does not ensure stability within the appropriate parameters an error is introduced into the gravity measurement.

In both types of gravimeters, that is those which are physically stabilized or those which use equipment to measure spatial orientation, the gravimeter is a complex and expensive instrument which may be limited in the manner in which data is collected or by the accuracy of the data. For example, a stabilized gravimeter will still require that a carrying vessel minimize or the limit the movement of the vessel either through flying straight and level flight paths in the case of an aircraft or that where measurements are carried out on a calm day in the case of a ship. Hence, gravimeter measurements are often limited by weather conditions.

There has, therefore, been a need for a gravimeter that overcomes the limitations of past gravimeters and that enables high resolution gravity measurements to be conducted. Such a system should not require the gravity sensing accelerometers to be on a stabilized platform or require that the spatial orientation of the accelerometers be measured.

Accordingly, there has been a need for a gravity meter which is simpler, more accurate and less expensive to build than gravity meters currently used and/or disclosed.

LaCoste et al, U.S. Pat. No. 3,474,672 discloses a stabilized platform for gravimeters where the platform that supports the gravity sensor is physically aligned to the local horizontal and, hence, describes a gravimeter utilizing a stabilized platform.

Carson and Gumert, in U.S. Pat. No. 4,435,981 disclose a method and instrumentation for gravity surveying of a stabilized platform type.

Evans, U.S. Pat. No. 4,550,601 discloses a method for measuring gravity with the Global Positioning System and a suitable gravimeter, and specifically describes the platform that holds the gravity sensing elements as being stabilized to the geoid.

Panenka, Canadian Patent No. 2,104,354 discloses a system for conducting airborne gravity surveys and the system described there contains at least one inertial measurement unit (IMU), in which there are gyroscopes that are required for the IMU to function; and where the gyroscopes are measuring the orientation of the accelerometers in space.

Boedecker et al., (Tests Towards Strapdown Airborne Gravimetry, 1994) describe a scalar gravity system where the alignment of the gravity sensing accelerometer is measured by a GPS attitude system.

Czompo, UCGE Report No. 20067 describes a mathematical formula which shows that an accelerometer triad of arbitrary orientation can be used to measure the magnitude of gravity if precise kinematic accelerations are available from a suitable source. This publication describes a mathematically derived abstract gravity meter called a Rotation Invariant Scalar Gravimeter (RISG).

In the RISG, the sensing element is an accelerometer triad, consisting of three accelerometers. The accelerometers are virtually orthogonal to each other so that the magnitude of the specific force, f, can be obtained by computing the square root of the sum of the square of the individual accelerometer measurements. Virtual orthogonality is understood such that the actual accelerometers may not necessarily be orthogonal but they are calibrated by a suitable calibration method in such a way that possible non-orthogonality errors are corrected.

This sensor assembly is able to determine the magnitude of gravity using a computational method given in the following. First, Equation 1 is transformed into the local level system:

$$\vec{g} = \vec{q} - \vec{f} \quad \text{(Equation 2)}$$

where the components of the vector Equation 2 are horizontal and vertical; vector $\vec{q}$ is the kinematic acceleration vector expressed in the local level coordinate system. Assuming that the gravity vector is vertical, the following equation is obtained:

$$g = \sqrt{f^2 - q_x^2 - q_y^2} - q_z \quad \text{(Equation 3)}$$

where g is the magnitude of gravity, $q_x$ and $q_y$ are the horizontal, $q_z$ is the vertical component of the kinematic acceleration vector.

Equation 3 states that the magnitude of gravity can be determined by measuring the magnitude of the specific force, f, and the components of the kinematic accelerations at the sensor assembly.

In Equation 1 and the above equations derived from it, it is assumed that the vectors correspond to the same point is space, namely the center of the accelerometer triad. In practice this cannot be achieved because the kinematic reference point (KRP) where the kinematic accelerations are actually measured, such as the phase center of a GPS antenna, cannot be at the same place as the accelerometers. In general, the kinematic accelerations measured at the reference point are not the same as those experienced by the accelerometers which will cause the so-called the lever arm error.

More specifically, the lever arm is a spatial vector between the KRP (usually the phase center of a GPS antenna) and the nominal center of the acceleration sensor block. Because of the lever arm, the position of the KRP is not the same as the location of the sensor block, thus there will be a position-dependent gravity error. This error is usually very small and can be well approximated by approximating the orientation of the lever arm. However, because of the potential rotation of the lever arm, the kinematic acceleration of the KRP may differ from the kinematic acceleration sensed by the sensor block and that will cause an error which can be very large for precise gravity surveys.

It is important to emphasize that the lever arm error exists when the kinematic accelerations measured at the KRP and the kinematic accelerations present at the sensor block are different. Furthermore, it is important to note that the lever arm error is not caused by a translational movement of the lever arm (when the lever arm remains parallel to its previous orientations) but when the lever arm rotates.

Thus, there has been a need for a method and instrumentation for a new scalar gravimeter in which the lever arm error is internally measured and where the measurement of the lever arm correction does not require the measurement of the sensor orientation.

SUMMARY OF THE INVENTION

In accordance with the invention, an apparatus for measuring the magnitude of gravity is provided, the apparatus comprising:

means for calculating acceleration at a first nominal center; means for calculating acceleration at a second nominal center; kinematic acceleration measurement means for measuring kinematic acceleration at a kinematic reference point (KRP) wherein the first nominal center, second nominal center and kinematic reference point are collinear and the first nominal center and the second nominal center are each a and known fixed distance from the kinematic reference point;

means for calculating gravitational acceleration at the kinematic reference point.

In various embodiments of the apparatus, the means for calculating acceleration at the first and second nominal centers includes three virtually orthogonal accelerometers and the means for calculating gravitational acceleration at the kinematic reference point includes a Global Positioning System (GPS) antenna having means for calculating kinematic acceleration at the KRP mounted in a sensor mounting block.

In a further embodiment, the means for calculating gravitational acceleration at the KRP includes:

means for estimating the difference in gravity between the KRP and first nominal center;

means for estimating the difference in gravity between the first and second nominal centers;

means for determining a corrected force at the first nominal center from the acceleration at the first nominal center and the gravity difference between the KRP and the first nominal center;

means for determining a corrected force at the second nominal center from the acceleration at the second nominal center and the gravity difference between the first and second nominal centers;

means for determining an interpolated specific force at the KRP from the corrected force at the first nominal center, the corrected force at the second nominal center and the distance between the KRP and first nominal center and the distance between the first and second nominal centers;

means for determining the gravitational acceleration at the KRP from the interpolated specific force and the kinematic acceleration at the KRP.

In a still further embodiment, the means for estimating the difference in gravity between the KRP and first nominal center and the means for estimating the difference in gravity between the first and second nominal centers includes a database of gravity values and program means for retrieving a gravity value for a given coordinate.

In a further still embodiment, the means for estimating the difference in gravity between the KRP and first nominal center and the means for estimating the difference in gravity between the first and second nominal centers includes dynamic tilt sensing means for measuring the dynamic tilt of the apparatus for correction of the estimate of the difference in gravity between the KRP and first nominal center and the estimate of the difference in gravity between the first and second nominal centers.

In a specific embodiment of the invention, an apparatus for measuring the magnitude of gravity is provided comprising:

a sensor block;

a global positioning system antenna within the sensor block and a processor for measuring kinematic acceleration at a kinematic reference point (KRP);

a first virtually orthogonal acclerometer triad within the sensor block for measuring acceleration at a first nominal center wherein the first nominal center is a fixed and known distance from the KRP;

a second virtually orthogonal acclerometer triad within the sensor block for measuring acceleration at a second nominal center wherein the second nominal center is a fixed and known distance from the KRP and is collinear with respect to the first nominal center and the KRP and corresponding accelerometers of the first and second triad are virtually parallel;

means for estimating the difference in gravity between the KRP and first nominal center;

means for estimating a difference in gravity between the first and second nominal centers;

means for determining a corrected force at the first nominal center from the acceleration at the first nominal center and the gravity difference between the KRP and the first nominal center;

means for determining a corrected force at the second nominal center from the acceleration at the second nominal center and the gravity difference between the first and second nominal centers;

means for determining an interpolated specific force at the KRP from the corrected force at the first nominal center, the corrected force at the second nominal center and the distance between the KRP and first nominal center and the distance between the first and second nominal centers;

means for determining the gravitational acceleration at the KRP from the interpolated specific force and the kinematic acceleration at the KRP.

The invention also provides a method of measuring the magnitude of gravity in an apparatus having a first nominal center, second nominal center and kinematic reference point wherein the first nominal center and second nominal center are collinear with and at a fixed and known distance from the kinematic reference point, the method comprising the steps of:

a. determining acceleration at the first nominal center;

b. determining acceleration at the second nominal center;

c. determining kinematic acceleration at a kinematic reference point;

d. calculating the gravitational acceleration at the kinematic reference point from the acceleration at the first nominal center and the second nominal center, the kinematic acceleration and the distance between the kinematic reference point and the first nominal center and the distance between the first nominal center and the second nominal center.

In a further and more specific embodiment, the method includes correlating the estimate of the difference in gravity between the KRP and first nominal center and the estimate of the difference in gravity between the first and second nominal centers to the dynamic tilt of the apparatus.

In a specific embodiment, a method of measuring gravity is provided comprising the steps of:

a. measuring kinematic acceleration at a kinematic reference point (KRP);

b. measuring acceleration at a first nominal center;

c. measuring acceleration at a second nominal center;

d. estimating the difference in gravity between the KRP and first nominal center from a gravity model;

e. estimating the difference in gravity between the first and second nominal centers from a gravity model;

f. calculating a corrected force at the first nominal center from the acceleration at the first nominal center and the gravity difference between the KRP and the first nominal center;

g. calculating a corrected force at the second nominal center from the acceleration at the second nominal center and the gravity difference between the first and second nominal centers;

h. calculating an interpolated specific force at the KRP from the corrected force at the first nominal center, the corrected force at the second nominal center and the distance between the KRP and first nominal center and the distance between the first and second nominal centers;

i. calculating the gravitational acceleration at the KRP from the interpolated specific force and the kinematic acceleration at the KRP.

DETAILED DESCRIPTION OF THE INVENTION

Figure 1:
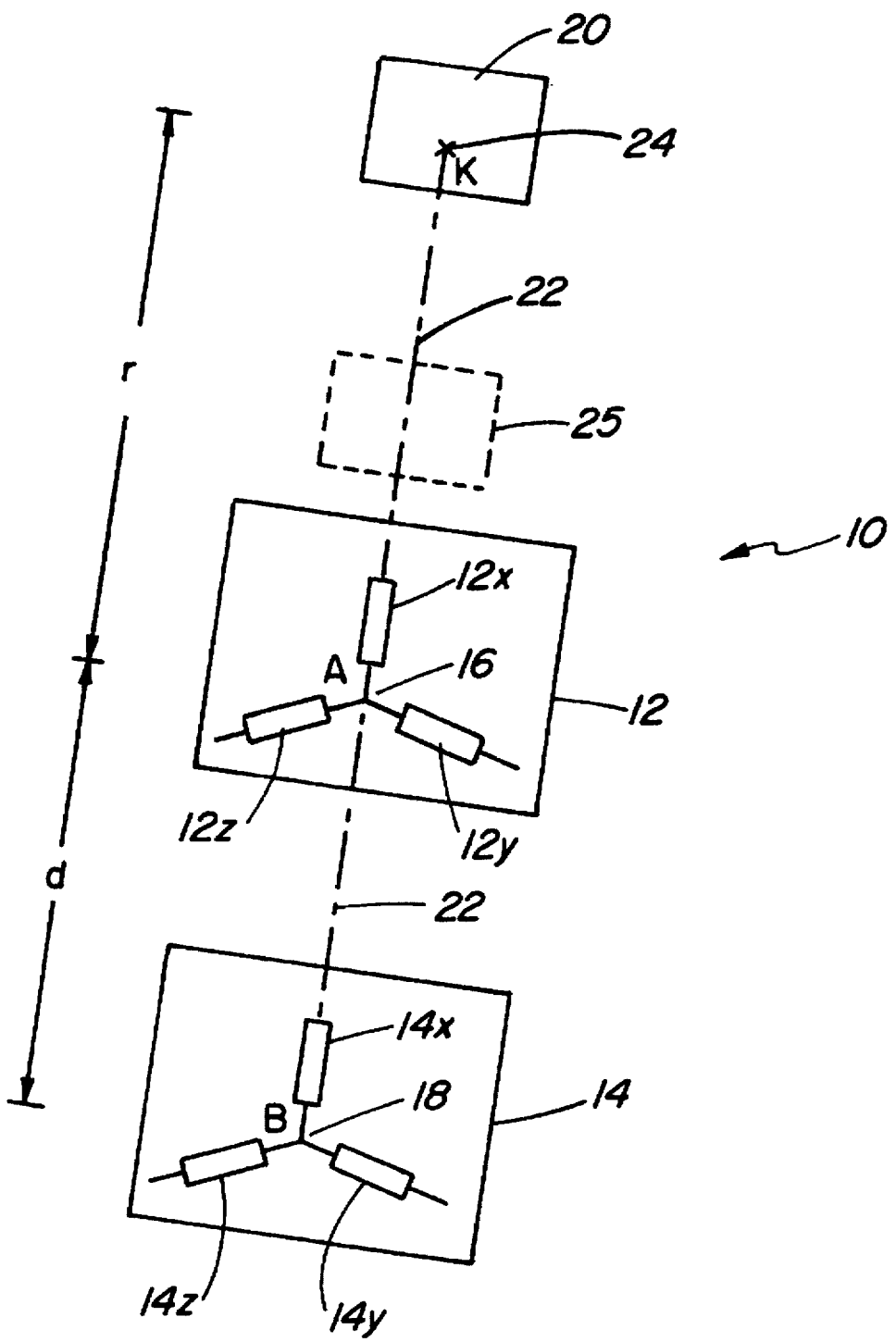
FIG. 1 is a schematic view of a gravimeter in accordance with the invention showing the orientation and location of the KRP and nominal centers of the accelerometer triads.

In accordance with the invention, an apparatus 10 for measuring the magnitude of gravity is shown schematically in FIG. 1. The apparatus 10 includes two accelerometer triads 12 and 14 having nominal centers 16 and 18 respectively and a kinematic acceleration means 20. The kinematic acceleration means preferably utilizes a Global Positioning System (GPS) receiver. The accelerometer triads 12 and 14 are rigidly interconnected at a known distance d and define an axis in space referred to as the main axis of the gravimeter. The main axis is shown as a dotted line designated 22. Collinear with the main axis lies the kinematic reference point (KRP) 24, the nominal center of the kinematic reference means 20 (normally corresponding to the phase center of a GPS antenna). The KRP 24 is rigidly connected to the acclerometer triads 12 and 14 so that the distance, r, between the KRP 24 and each of the nominal centers 16 and 18 is fixed and known.

The accelerometer triads 12 and 14 are each composed of three virtually orthogonal accelerometers 12x, 12y, 12z, 14x, 14y and 14z, respectively and are assembled such that accelerometers 12x and 14x are parallel both with respect to one another and the main axis 22 of the gravimeter 10. Similarly, accelerometers 12y and 14y are virtually parallel with respect to one another as are accelerometers 12z and 14z. Marginal errors in alignment, that is with respect to the orthogonality or parallelity of corresponding accelerometers can be corrected computationally. Accelerometers 14x and 16x are referred to as the along-axis accelerometers whereas accelerometers 12y, 12z, 14y and 14z are referred to as the off-axis accelerometers.

An optional tilt sensor 25 may be implemented in various embodiments of the invention as will be more fully described below.

Figure 2:
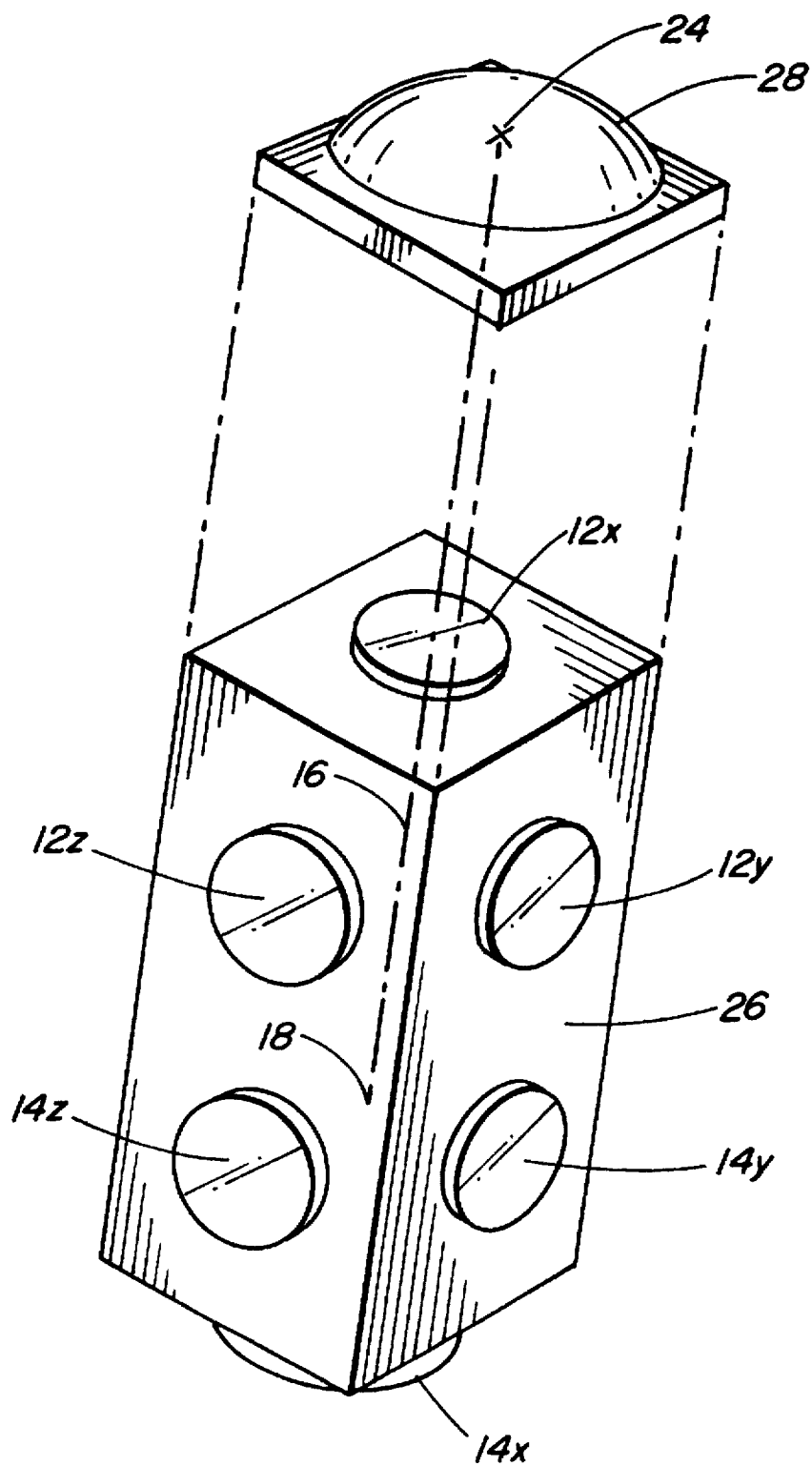
FIG. 2 is a schematic view of a gravimeter in accordance with the invention.

FIG. 2 is a schematic representation of a gravimeter in accordance with the invention, showing the along-axis accelerometers 12x and 14x, and the off-axis accelerometers 12y, 12z, 14y and 14z mounted on a sensor block 26. The sensor block 26 may be fabricated from a suitable material such as metal or rigid plastic. The KRP 24, the nominal center of a GPS antenna 28, is rigidly connected to the sensor block 26 such that the KRP 24 is collinear with the nominal centers of the accelerometer triads 12 and 14 as discussed above. Appropriate controlling and computational hardware and software will preferably form a component of the gravimeter 10.

In accordance with the above, kinematic acceleration can be measured at the KRP 24 as can acceleration at the nominal centers 16 and 18. In order to correlate the individual acceleration measurements at the nominal centers 16 and 18 to the kinematic acceleration at the KRP, the lever arm error is determined in order to account for any differences in the nominal center kinematic accelerations on the basis of the physical distance between the KRP and each nominal center.

Figure 3:
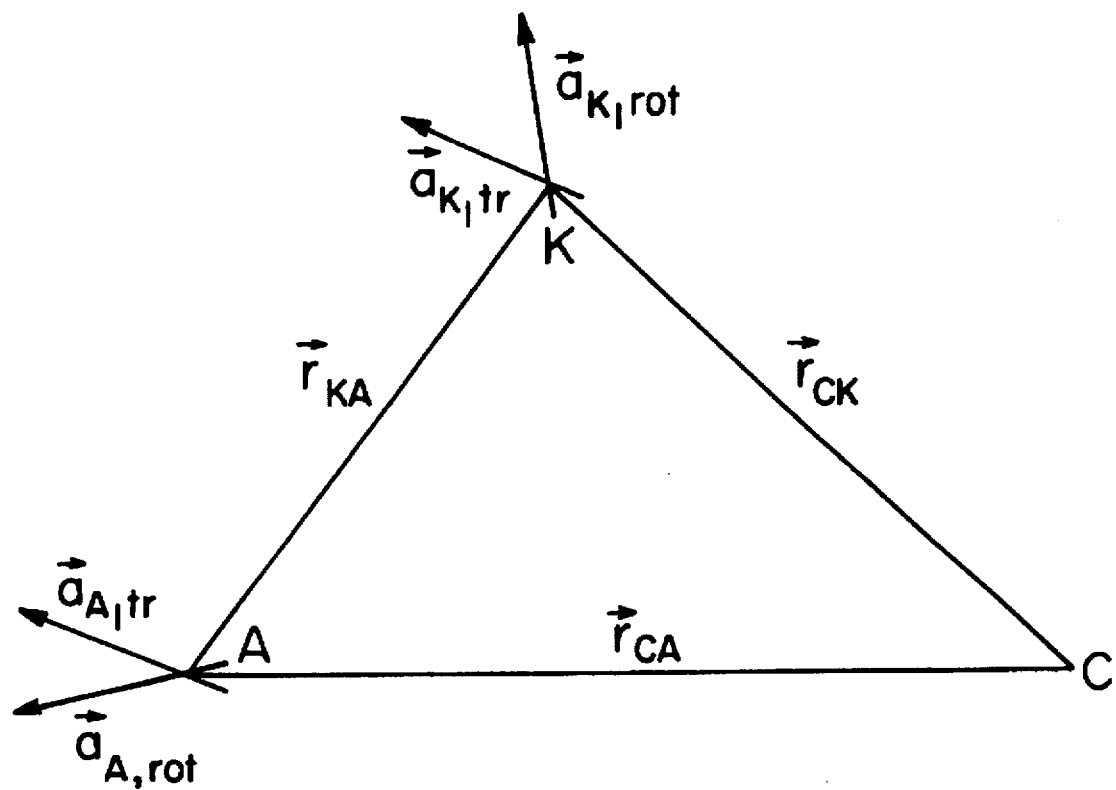
FIG. 3 is a schematic representation of the translational and rotational accelerations present at the KRP and one point, resulting in the lever arm error.

As shown in FIG. 3, the acceleration and position vectors for motion at the KRP (point K) and nominal center 12 (point A) are depicted for the situation where the instantaneous center of rotation is C of the points A and K. If the instantaneous center of rotation is C, then the relative position vectors pointing to the KRP and A are $\vec{r}_{CK}$ and $\vec{r}_{CA}$, respectively. The relative position vector between K and A is $\vec{r}_{KA}$. Since the acceleration experienced at any arbitrary point, P, is the sum of the translational and rotational accelerations $\vec{a}_{P,tr}$ and $\vec{a}_{P,rot}$, respectively, the acceleration experienced at the KRP is $$\vec{a}_K = \vec{a}_{K,tr} + \vec{a}_{K,rot} \quad \text{(Equation 4)}$$

and at the nominal center of one of the accelerometers is $$\vec{a}_A = \vec{a}_{A,tr} + \vec{a}_{A,rot} \quad \text{(Equation 5)}$$

Since the KRP and point A are rigidly connected the translational components are equal:

$$\vec{a}_{K,tr} = \vec{a}_{A,tr} \quad \text{(Equation 6)}$$

while the rotational components are generally different.

The rotational part of the accelerations at an arbitrary point, P, can be divided into two parts: the centripetal acceleration $\vec{a}_{P,cp}$ and the tangential acceleration $\vec{a}_{P,tan}$ such that, for the KRP, $$\vec{a}_{K,rot} = \vec{a}_{K,cp} + \vec{a}_{K,tan} \quad \text{(Equation 7)}$$

and $$\vec{a}_{A,rot} = \vec{a}_{A,cp} + \vec{a}_{A,tan} \quad \text{(Equation 8)}$$

It is known from elementary physics that these acceleration components can be computed using the following formulas:

$$\vec{a}_{K,cp} = -\vec{r}_{CK} \cdot \omega^2 \quad \text{(Equation 9)}$$

$$\vec{a}_{A,cp} = -\vec{r}_{CA} \cdot \omega^2 \quad \text{(Equation 10)}$$

$$\vec{a}_{K,tan} = -\vec{r}_{CK} \times \vec{\dot{\omega}} \quad \text{(Equation 11)}$$

$$\vec{a}_{A,tan} = -\vec{r}_{CA} \times \vec{\dot{\omega}} \quad \text{(Equation 12)}$$

where $\omega$ is the magnitude of the angular velocity vector and $\vec{\dot{\omega}}$ is the angular acceleration vector; x denotes the vector product. After the necessary substitutions, the acceleration at point K is $$\vec{a}_K = \vec{a}_{K,tr} - \vec{r}_{CK} \cdot \omega^2 - \vec{r}_{CK} \times \vec{\dot{\omega}} \quad \text{(Equation 13)}$$

and at point A the acceleration is $$\vec{a}_A = \vec{a}_{A,tr} - \vec{r}_{CA} \cdot \omega^2 - \vec{r}_{CA} \times \vec{\dot{\omega}} \quad \text{(Equation 14)}$$

The lever arm error, as described above, is the difference between the accelerations experienced at points K and A. After subtracting Equation 13 from Equation 14, using Equation 6 and the relationship $$\vec{r}_{KA} = \vec{r}_{CA} - \vec{r}_{CK} \quad \text{(Equation 15)}$$

one obtains the following expression for the lever arm error, $a_{la,K}$, $$\vec{a}_{la,KA} = \vec{a}_A - \vec{a}_K = -\vec{r}_{KA} \cdot \omega^2 - \vec{r}_{KA} \times \vec{\dot{\omega}} \quad \text{(Equation 16)}$$

where $\vec{a}_{la,KA}$ is the lever arm error at point A, with respect to point K. Equation 13 shows that the lever arm correction is linearly dependent upon the relative position vector $\vec{r}_{KA}$ between points K and A. Therefore, the lever arm correction cannot be precisely computed without knowing the spatial orientation of the accelerometer triad-which is represented by the spatial orientation of vector $\vec{r}_{KA}$, even if the angular velocity and angular acceleration vectors were known from other measurements such as from gyros.

For the schematic apparatus as shown in FIG. 1, Points K and A correspond to the KRP and the nominal center 16 one of the accelerometers 12, respectively. The center of the other accelerometer triad is denoted by B. Then, similarly to Equation 14, the acceleration experienced at point B is $$\vec{a}_B = \vec{a}_{B,tr} - \vec{r}_{CB} \cdot \omega^2 - \vec{r}_{CB} \times \vec{\dot{\omega}} \quad \text{(Equation 17)}$$

The difference between Equations 17 and 14 is essentially the lever arm error at point B with respect to point A:

$$\vec{a}_{la,AB} = \vec{a}_B - \vec{a}_A = -\vec{r}_{AB} \cdot \omega^2 - \vec{r}_{AB} \times \vec{\dot{\omega}} \quad \text{(Equation 18)}$$

as $$\vec{r}_{AB} = \vec{r}_{CB} - \vec{r}_{CA} \quad \text{(Equation 19)}$$

and $$\vec{a}_{B,tr} = \vec{a}_{A,tr} \quad \text{(Equation 20)}$$

Since points K, A and B are collinear $$\vec{r}_{KA} = \vec{r}_{AB} \cdot \frac{r_{KA}}{r_{AB}} \quad \text{(Equation 21)}$$

where $r_{KA}$ is the length of vector $\vec{r}_{KA}$ and $r_{AB}$ is the length of vector $\vec{r}_{AB}$. Then, from equation 16, $$\vec{a}_{la,KA} = \vec{a}_{la,AB} \cdot \frac{r_{KA}}{r_{AB}} \quad \text{(Equation 22)}$$

Since $r_{KA}$ and $r_{AB}$ are known, the lever arm error at point A with respect to point K can be computed from the lever arm error at point B with respect to point A.

According to Equation 1, the acceleration is the sum of the gravitational acceleration, g, and the specific force, f, where f is the acceleration that could be measured by an accelerometer:

$$\vec{a}_K = \vec{g}_K + \vec{f}_K \quad \text{(Equation 23)}$$

$$\vec{a}_A = \vec{g}_A + \vec{f}_A \quad \text{(Equation 24)}$$

$$\vec{a}_B = \vec{g}_B + \vec{f}_B \quad \text{(Equation 25)}$$

The force, $\vec{f}_K$ is not actually measured since there are no accelerometers at point K, rather $\vec{f}_K$ is the specific force that would be measured by accelerometers. With this, $$\vec{a}_{lo,KA} = \vec{g}_A - \vec{g}_K + \vec{f}_A - \vec{f}_K \quad \text{(Equation 26)}$$

$$\vec{a}_{lo,AB} = \vec{g}_B - \vec{g}_A + \vec{f}_B - \vec{f}_A \quad \text{(Equation 27)}$$

The gravity differences in the above two equations are not known precisely. However, they can be very well approximated because gravity is known to vary at a reasonably constant rate along a vertical axis. Thus, a gravity model can be utilized in conjunction with knowledge of the approximate position of the gravimeter and the approximate orientation of the level arm (or the main axis) to obtain a reasonable estimate of this difference. Considering a lever arm length of 1 or 2 meters, it can be determined that the anticipated gravity difference is a fraction of 1 mGal and the anticipated error in determining the gravity difference is negligible for precise surveys that aim at a 1 mGal accuracy.

For example, a known gravity model such as a database of known gravity values, positional coordinates and an appropriate retrieving program could be used to obtain an appropriate estimate of the gravity difference wherein an accuracy to within a fraction of a mGal could be achieved.

Furthermore, during actual measurement, it is possible to mount the instrument such that the main axis is close to horizontal in which case the gravity difference itself is negligibly small. As a further embodiment, the use of additional sensors, such as a dynamic tilt sensor could be utilized to determine the specific tilt of the lever arm at a particular moment in time. Accordingly, if a gravity difference approximation is based upon a known database value, correlation to the actual tilt of the lever arm could be made to refine the accuracy of the gravity difference approximation in a dynamic or unstable environment.

Since the approximate orientation of the lever arm is usually known or considered to be known, it is possible to correct the accelerometer readings such that $$\vec{f}_{A,corr} = \vec{g}_A - \vec{g}_K + \vec{f}_A \quad \text{(Equation 28)}$$

and $$\vec{f}_{B,corr} = \vec{g}_B - \vec{g}_A + \vec{f}_B \quad \text{(Equation 29)}$$

Then, with Equation 22 one gets $$\vec{f}_{A,corr} - \vec{f}_K = (\vec{f}_{B,corr} - \vec{f}_A) \cdot \frac{r_{KA}}{r_{AB}} \quad \text{(Equation 30)}$$

The unknown $\vec{f}_K$ can be expressed as $$\vec{f}_K = \vec{f}_{A,corr} - (\vec{f}_{B,corr} - \vec{f}_A) \cdot \frac{r_{KA}}{r_{AB}} \quad \text{(Equation 31)}$$

The components of the above vector equation are expressed in the operational coordinate system, that is for example, the local level system in which the GPS measurements are available. However, the accelerometer measurements are available in the body frame of the sensor block. Between the two there is an unknown rotation because the orientation of the main axis is not known. This means that the components of the Equation 31 in the local level frame are not available numerically and Equation 31 cannot be used for further computations in this form.

However, in the RISG concept, only the length of vector $\vec{f}_K$ is needed which can be computed using the accelerometer readings of the instrument discussed herein even when its orientation is not known because the length of the specific force is rotation invariant. The square of the length is then $$f_K^2 = \left[ f_{A,corr,x} - (f_{B,corr,x} - f_{A,x}) \cdot \frac{r_{KA}}{r_{AB}} \right]^2 + \left[ f_{A,corr,y} - (f_{B,corr,y} - f_{A,y}) \cdot \frac{r_{KA}}{r_{AB}} \right]^2 + \left[ f_{A,corr,z} - (f_{B,corr,z} - f_{A,z}) \cdot \frac{r_{KA}}{r_{AB}} \right]^2 \quad \text{(Equation 32)}$$

Where the suffixes x, y and z identify the corresponding actual and corrected accelerometer readings. On the right hand side of Equation 32 only known (or very well approximated) quantities are present. Since $f_K^2$ corresponds to the same point K as the kinematic accelerations measured at K, the RISG processing formula in Equation 3 can be applied without the lever arm error.

Accordingly, the concept of lever arm corrected RISG, which could be called the TWIN-RISG, is summarized as follows: using a double accelerometer triad, the effective specific force measured at points A and B is interpolated to the kinematic reference point (KRP), thereby eliminating the lever arm error; then the RISG processing is applied utilizing the kinematic accelerations taken at the KRP and the interpolated specific force magnitude at the KRP.

Figure 4:
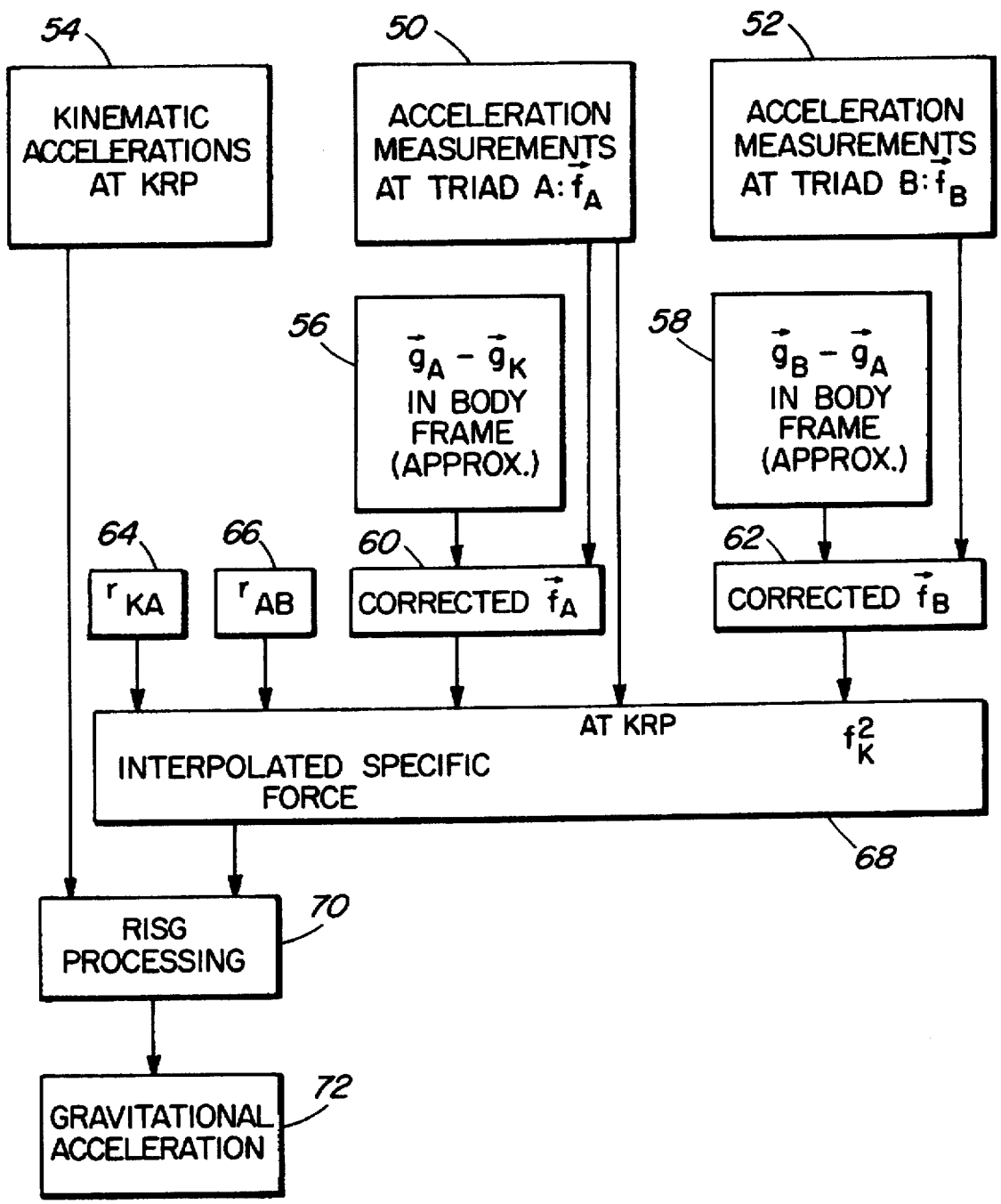
FIG. 4 is a flow chart showing a typical method of making a gravimeter measurement in accordance with the invention.

The main steps of the TWIN-RISG processing and the data flow are summarized in FIG. 4. With reference to FIG. 4, acceleration measurements (box 50 and 52) at accelerometer triads A and B are made as is a measurement of kinematic acceleration (box 54) at the KRP. An approximate determination of the gravity difference between points A and K (box 56) and an approximate determination of the gravity difference between points B and A (box 58). As indicated above, a known gravity model either alone or in conjunction with a tilt sensor can be utilized in order to obtain an accurate estimate of the gravity difference. These gravity difference estimates are then utilized to determine the corrected force acting at point A (box 60) from equation 28 and the corrected force acting at point B (box 62) from equation 29 respectively. Knowledge of the distance from point K to point A (box 64) and from point A to point B (box 66), the corrected force acting at point A (box 60), the acceleration measurement from triad A (box 50) and the corrected force acting at point B enables the determination of the interpolated specific force at the KRP (box 68) from equation 32. Further RISG processing (box 70) with knowledge of the kinematic acceleration at the KRP (box 54) determines the gravitational acceleration at the KRP (box 72) from equation 3.

Preferably, the apparatus of the invention will utilize a temperature stabilized box containing the accelerometer triads. Furthermore, it is preferred that the apparatus be suspended or supported by shock mounts to partly isolate the unit from vehicle motions and vibrations. QA3000 type accelerometers (Sundstrand) or a similar kind can be used in the accelerometer triads. The sensor block may be machined from any suitable metal such as aluminum or any suitable plastic. The instrument can be used airborne, ship borne, mounted on a buoy or a land vehicle, or any other suitable vessel.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. An apparatus for measuring the magnitude of gravity comprising:
 a. means for measuring specific force at a first nominal center;
 b. means for measuring specific force at a second nominal center;
 c. kinematic acceleration measurement means for measuring kinematic acceleration at a kinematic reference point (KRP) wherein the first nominal center, second nominal center and kinematic reference point are collinear and the first nominal center and the second nominal center are each a fixed and known distance from the kinematic reference point wherein measurement of the specific force at the first and second nominal centers and kinematic acceleration at the KRP are made independently of each other;
 d. means for calculating gravitational acceleration at the kinematic reference point on the basis of said independent measurement of the specific force at the first and second nominal centers and kinematic acceleration at the KRP.

2. An apparatus as in claim 1 wherein the means for measuring specific force at the first nominal center includes three virtually orthogonal accelerometers.

3. An apparatus as in claim 1 wherein the means for measuring specific force at the second nominal center includes three virtually orthogonal accelerometers.

4. An apparatus as in claim 1 wherein the means for calculating gravitational acceleration at the kinematic reference point includes a Global Positioning System (GPS) antenna and processor for calculating kinematic acceleration at the KRP.

5. An apparatus as in claim 1 wherein the means for measuring specific force at the first nominal center, means for measuring specific force at the second nominal center and the kinematic acceleration measurement means are mounted in a sensor mounting block.

6. An apparatus as in claim 1 wherein the means for calculating gravitational acceleration at the KRP includes:
 a. means for estimating the difference in gravity between the KRP and first nominal center;
 b. means for estimating the difference in gravity between the first and second nominal centers;
 c. means for determining a corrected force at the first nominal center from the specific force at the first nominal center and the gravity difference between the KRP and the first nominal center;
 d. means for determining a corrected force at the second nominal center from the specific force at the second nominal center and the gravity difference between the first and second nominal centers;
 e. means for determining an interpolated specific force at the KRP from the corrected force at the first nominal center, the corrected force at the second nominal center and the distance between the KRP and first nominal center and the distance between the first and second nominal centers;
 f. means for determining the gravitational acceleration at the KRP from the interpolated specific force and the kinematic acceleration at the KRP.

7. An apparatus as in claim 6 wherein the means for estimating the difference in gravity between the KRP and first nominal center and the means for estimating the difference in gravity between the first and second nominal centers includes a database of gravity values and program means for retrieving a gravity value for a given coordinate.

8. An apparatus as in claim 7 wherein the means for estimating the difference in gravity between the KRP and first nominal center and the means for estimating the difference in gravity between the first and second nominal centers includes dynamic tilt sensing means for measuring the dynamic tilt of the apparatus for correction of the estimate of the difference in gravity between the KRP and first nominal center and the estimate of the difference in gravity between the first and second nominal centers.

9. An apparatus as in claim 2 wherein the means for measuring specific force at the second nominal center includes three virtually orthogonal accelerometers.

10. An apparatus as in claim 9 wherein the means for calculating gravitational acceleration at the kinematic reference point includes a Global Positioning System (GPS) antenna and processor for calculating kinematic acceleration at the KRP.

11. An apparatus as in claim 10 wherein the means for calculating gravitational acceleration at the KRP includes:
 a. means for estimating the difference in gravity between the KRP and first nominal center;
 b. means for estimating the difference in gravity between the first and second nominal centers;
 c. means for determining a corrected force at the first nominal center from the specific force at the first nominal center and the gravity difference between the KRP and the first nominal center;
 d. means for determining a corrected force at the second nominal center from the specific force at the second nominal center and the gravity difference between the first and second nominal centers;
 e. means for determining an interpolated specific force at the KRP from the corrected force at the first nominal center, the corrected force at the second nominal center and the distance between the KRP and first nominal center and the distance between the first and second nominal centers;
 f. means for determining the gravitational acceleration at the KRP from the interpolated specific force and the kinematic acceleration at the KRP.

12. An apparatus as in claim 11 wherein the means for estimating the difference in gravity between the KRP and first nominal center and the means for estimating the difference in gravity between the first and second nominal centers includes a database of gravity values and program means for retrieving a gravity value for a given coordinate.

13. An apparatus as in claim 12 wherein the means for estimating the difference in gravity between the KRP and first nominal center and the means for estimating the difference in gravity between the first and second nominal centers includes dynamic tilt sensing means for measuring the dynamic tilt of the apparatus and for correction of the estimate of the difference in gravity between the KRP and first nominal center and the estimate of the difference in gravity between the first and second nominal centers.

14. An apparatus as in claim 13 wherein the first and second accelerometer triads and the kinematic acceleration measurement means are mounted in a sensor mounting block.

15. An apparatus for measuring the magnitude of gravity comprising:

a. a sensor block;

b. a global positioning system within the sensor block for measuring kinematic acceleration at a kinematic reference point (KRP);

c. a first virtually orthogonal accelerometer triad within the sensor block for measuring specific force at a first nominal center wherein the first nominal center is a fixed and known distance from the KRP;

d. a second virtually orthogonal accelerometer triad within the sensor block for measuring specific force at a second nominal center wherein the second nominal center is a fixed and known distance from the KRP and is collinear with respect to the first nominal center and the KRP and corresponding accelerometers of the first and second triad are virtually parallel;

e. means for estimating the difference in gravity between the KRP and first nominal center;

f. means for estimating a difference in gravity between the first and second nominal centers;

g. means for determining a corrected force at the first nominal center from the specific force at the first nominal center and the gravity difference between the KRP and the first nominal center;

h. means for determining a corrected force at the second nominal center from the specific force at the second nominal center and the gravity difference between the first and second nominal centers;

i. means for determining an interpolated specific force at the KRP from the corrected force at the first nominal center, the corrected force at the second nominal center and the distance between the KRP and first nominal center and the distance between the first and second nominal centers;

j. means for determining the gravitational acceleration at the KRP from the interpolated specific force and the kinematic acceleration at the KRP.

16. A method of measuring the magnitude of gravity in an apparatus having a first nominal center, second nominal center and kinematic reference point wherein the first nominal center and second nominal center are collinear with and at a fixed and known distance from the kinematic reference point, the method comprising the steps of:

a. measuring specific force at the first nominal center;

b. measuring specific force at the second nominal center;

c. measuring kinematic acceleration at a kinematic reference point;

d. calculating the gravitational acceleration at the kinematic reference point from the specific force at the first nominal center and the second nominal center, the kinematic acceleration and the distance between the kinematic reference point and the first nominal center and the distance between the first nominal center and the second nominal center.

17. A method as in claim 16 wherein steps c) and d) include correlating the estimate of the difference in gravity between the KRP and first nominal center and the estimate of the difference in gravity between the first and second nominal centers to the dynamic tilt of the apparatus.

18. A method of measuring gravity comprising the steps of:

a. measuring kinematic acceleration at a kinematic reference point (KRP);

b. measuring specific force at a first nominal center;

c. measuring specific force at a second nominal center;

d. estimating the difference in gravity between the KRP and first nominal center from a gravity model;

e. estimating the difference in gravity between the first and second nominal centers from a gravity model;

f. calculating a corrected force at the first nominal center from the specific force at the nominal center and the gravity difference between the KRP and the first nominal center;

g. calculating a corrected force at the second nominal center from the specific force at the second nominal center and the gravity difference between the first and second nominal centers;

h. calculating an interpolated specific force at the KRP from the corrected force at the first nominal center, the corrected force at the second nominal center and the distance between the KRP and first nominal center and the distance between the first and second nominal centers;

i. calculating the gravitational acceleration at the KRP from the interpolated specific force and the kinematic acceleration at the KRP.

* * * * *